United States Patent [19]

Osawa

[11] Patent Number: 5,732,157
[45] Date of Patent: Mar. 24, 1998

[54] IMAGE PROCESSING APPARATUS AND METHOD USING LOSSLESS ENCODING OF A DIFFERENCE BETWEEN IMAGE BLOCKS

[75] Inventor: Hidefumi Osawa, Kawaguchi, Japan

[73] Assignee: Canon Kabushiki Kaisha, Tokyo, Japan

[21] Appl. No.: 356,467

[22] Filed: Dec. 15, 1994

[30] Foreign Application Priority Data

Dec. 15, 1993 [JP] Japan ................................ 5-315182

[51] Int. Cl.$^6$ ....................................... H04R 29/00
[52] U.S. Cl. ..................... 382/244; 382/232; 348/400; 348/409; 348/420
[58] Field of Search ........................... 382/232, 238, 382/244, 249, 250; 358/433; 348/384, 390, 400, 401, 402, 409, 410, 411, 412–416, 420

[56] References Cited

U.S. PATENT DOCUMENTS

| | | | |
|---|---|---|---|
| 4,546,386 | 10/1985 | Matsumoto | 348/412 |
| 4,754,336 | 6/1988 | Nishizawa | 358/261.1 |
| 4,802,006 | 1/1989 | Iinuma | 348/412 |
| 4,837,618 | 6/1989 | Hatori | 348/401 |
| 5,020,121 | 5/1991 | Rosenberg | 382/238 |
| 5,054,103 | 10/1991 | Yasuda | 382/238 |
| 5,063,444 | 11/1991 | Knauer | 348/398 |
| 5,065,446 | 11/1991 | Suzuki | 358/433 |
| 5,101,280 | 3/1992 | Moronaga | 358/433 |
| 5,107,345 | 4/1992 | Lee | 382/250 |
| 5,109,438 | 4/1992 | Alves | 358/433 |
| 5,113,457 | 5/1992 | Enomoto | 382/238 |
| 5,166,987 | 11/1992 | Kageyama | 358/433 |
| 5,262,878 | 11/1993 | Esserman | 358/433 |
| 5,293,434 | 3/1994 | Feig | 382/250 |
| 5,327,502 | 7/1994 | Katata | 358/433 |
| 5,347,600 | 9/1994 | Barnsley | 383/249 |
| 5,355,378 | 10/1994 | Ohta | 358/433 |
| 5,369,503 | 11/1994 | Burel | 358/433 |
| 5,387,938 | 2/1995 | Fukuda | 348/420 |
| 5,394,190 | 2/1995 | Yamada | 348/411 |
| 5,416,606 | 5/1995 | Katayama | 358/433 |
| 5,416,856 | 5/1995 | Jacobs | 358/433 |
| 5,428,693 | 6/1995 | Murakami | 382/232 |
| 5,442,459 | 8/1995 | Gahang | 358/433 |
| 5,486,863 | 1/1996 | Auyeung | 348/420 |

*Primary Examiner*—Dwayne Bost
*Assistant Examiner*—Brian L. Johnson
*Attorney, Agent, or Firm*—Fitzpatrick, Cella, Harper & Scinto

[57] ABSTRACT

This invention has as its object to provide an image coding method which can efficiently encode image data by fully utilizing a two-dimensional correlation of an image. A block matching means searches for a block position corresponding to a minimum absolute value sum of differences of a pixel block to be encoded from already encoded pixel blocks. The searched block position information is encoded by an encoder, and the searched inter-block difference value is Huffman-encoded by another encoder. A code generator generates encoded data using these codes.

5 Claims, 11 Drawing Sheets

FIG. 3
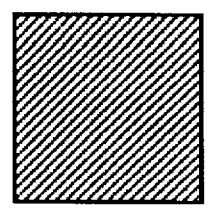 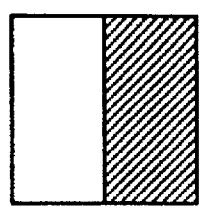 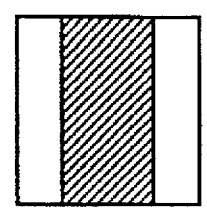 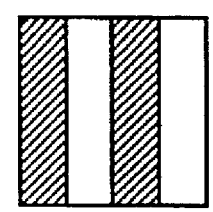
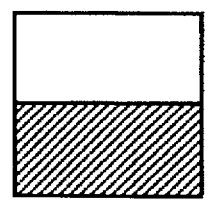 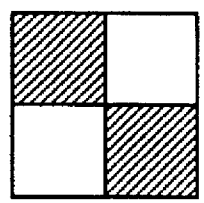 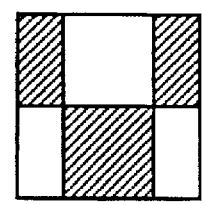 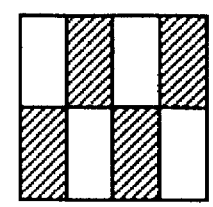
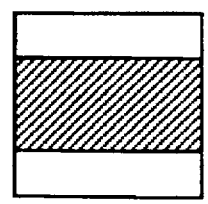 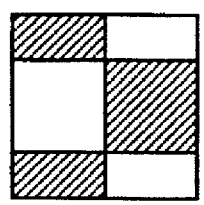 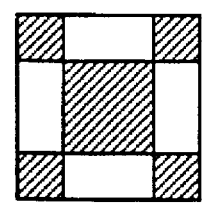 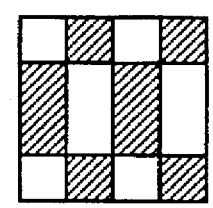
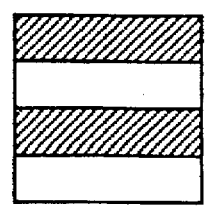 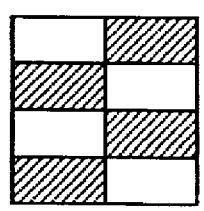 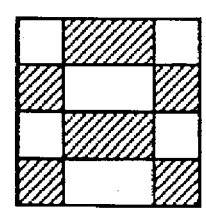 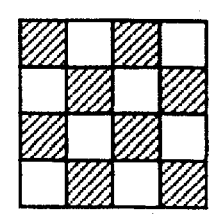

FIG. 4

| 0 | 1 | 5 | 6 |
|---|---|---|---|
| 2 | 4 | 7 | 12 |
| 3 | 8 | 11 | 13 |
| 9 | 10 | 14 | 15 |

FIG. 5

| LEVEL | COMPONENT VALUE | NO. OF BITS TO BE ADDED |
|---|---|---|
| 1 | -1. 1 | 1 |
| 2 | -3. -2. 2. 3 | 2 |
| 3 | -7. . -4. 4. . 7 | 3 |
| 4 | -15. . -8. 8. . 15 | 4 |
| 5 | -31. . -16. 16. . 31 | 5 |
| 6 | -63. . -32. 32. . 63 | 6 |
| 7 | -127. . -64. 64. . 127 | 7 |
| 8 | -255. . -128. 128. . 255 | 8 |
| 9 | -511. . -256. 256. . 511 | 9 |
| 10 | -1023. . -512. 512. . 1023 | 10 |
| 11 | -2047. . -1024. 1024. . 2047 | 11 |
| 12 | -4095. . -2048. 2048. . 4095 | 12 |
| 13 | -8191. . -4096. 4096. . 8191 | 13 |
| 14 | -16383. . -8192. 8192. . 16383 | 14 |
| 15 | -32767. . -16384. 16384. . 32767 | 15 |

FIG. 6

| LEVEL \ RUN | 0 | 1 | 2 | ---- | 15 |
|---|---|---|---|---|---|
| 0 | EOB | | | | |
| 1 | CODE WORD | CODE WORD | CODE WORD | CODE WORD | CODE WORD |
| 2 | CODE WORD | CODE WORD | CODE WORD | CODE WORD | CODE WORD |
| 3 | CODE WORD | CODE WORD | CODE WORD | CODE WORD | CODE WORD |
| ⋮ | ⋮ | ⋮ | ⋮ | ⋮ | ⋮ |

FIG. 12

| c | b |
|---|---|
| a | x |

(1) ; a
(2) ; b
(3) ; c
(4) ; a+b−c
(5) ; a+((b−c) / 2)
(6) ; b+((a−c) / 2)
(7) ; (a+b) / 2

IMAGE PROCESSING APPARATUS AND METHOD USING LOSSLESS ENCODING OF A DIFFERENCE BETWEEN IMAGE BLOCKS

BACKGROUND OF THE INVENTION

1. Field of the Invention

The present invention relates to an image processing apparatus and method and, more particularly, to an image processing apparatus and method, which are suitable for reversible coding of still images and frame images of motion picture.

As a conventional reversible coding method in an apparatus of this type, a JPEG method as an international standard, which method uses DPCM and Huffman coding, is generally known.

In this method, a predictive value is subtracted from a pixel of interest to obtain a predictive error, and a variable length code such as Huffman codes is assigned to the predictive error.

Figure 12:
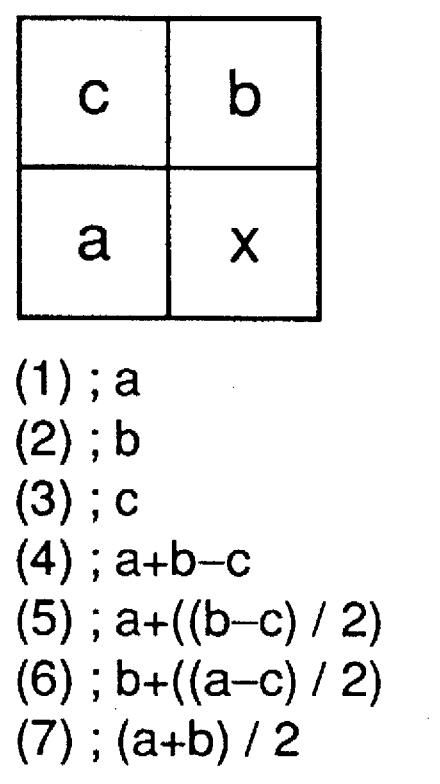

FIG. 12 is a view for explaining an example of a predictive method in a DPCM & Huffman coding method.

Referring to FIG. 12, a pixel x is a pixel of interest, and pixels a, b, and c are surrounding pixels used for prediction. Seven predictive formulas (1) to (7) shown in FIG. 12 are available, and one of these formulas can be selected.

However, since the above-mentioned prior art uses only a pixel correlation among neighboring pixels, a two-dimensional correlation of a still image cannot be fully utilized, and coding efficiency cannot be improved.

SUMMARY OF THE INVENTION

The present invention has been made in consideration of the above situation, and has as its object to perform efficient coding by utilizing a two-dimensional correlation of an image.

According to the present invention, the foregoing objects are attained by providing an image processing apparatus comprising: input means for inputting image data representing one picture; dividing means for dividing the image data into a plurality of blocks; and encoding means for encoding the image data in units of blocks; wherein said encoding means includes searching means for searching a first block which is similar to a second block to be encoded based on the image data which is not encoded by said encoding means, and encodes the image data in the second block by using the image data in the first block.

It is another object of the present invention to more efficiently utilize a two-dimensional correlation of an image.

According to the present invention, the foregoing objects are attained by providing an image processing apparatus comprising: input means for inputting image data representing one picture; dividing means for dividing the image data into a plurality of blocks; and encoding means for encoding the image data in units of blocks; wherein said encoding means includes searching means for searching a first block which is similar to a second block to be encoded based on the image data input by said input means and relation between the first block and the second block and encodes the image data in the second block by using the image data in the first block.

It is still another object of the present invention to provide a coding algorithm suitable for high-speed processing.

It is still another object of the present invention to improve efficiency of reversible coding.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view for explaining sequency components of Hadamard transform in the first embodiment;

FIG. 4 is a view showing the zigzag scan order in a zigzag scan circuit shown in FIG. 2;

FIG. 5 is a view for explaining the relationship between level discrimination and bits to be added in a level detection circuit shown in FIG. 2;

FIG. 6 is an explanatory view of a Huffman table shown in FIG. 2;

FIG. 12 is a view for explaining a predictive method in a conventional coding method.

DETAILED DESCRIPTION OF THE INVENTION (Embodiment of the Invention)

The preferred embodiments of the present invention will be described hereinafter with reference to the accompanying drawings.

(First Embodiment)

Figure 1:
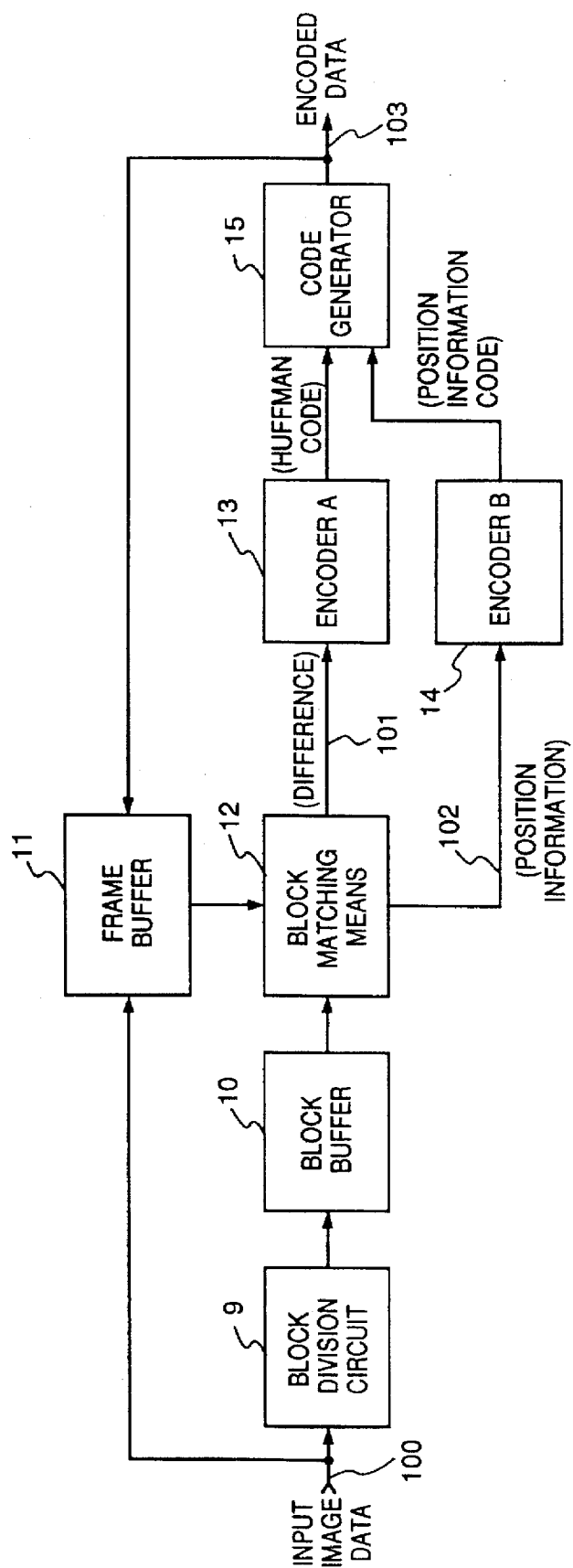
FIG. 1 is a block diagram showing the arrangement of an image encoder in an image processing apparatus according to the first embodiment of the prevent invention.

FIG. 1 is a block diagram showing the arrangement of an image encoder in an image processing apparatus according to the first embodiment of the present invention.

Referring to FIG. 1, image data 100 as an object to be encoded, which is input in units of lines, is divided into blocks by a block division circuit 9, and blocks to be encoded are stored in a block buffer 10. On the other hand, the input image data 100 is also supplied to a frame buffer 11, and is stored in the frame buffer 11 together with already encoded data of a frame associated with the corresponding coding processing.

A block matching means 12 extracts a 4×4 pixel block in a search range, and calculates a difference value between the extracted block and 4×4 image data at an encoded block position in the identical frame stored in the frame buffer 11 by decoding encoded data from a code generator 15. The means 12 outputs block position information 102 corresponding to a minimum absolute value sum to an encoder B 14, and outputs a calculated difference value 101 to an encoder A 13.

The encoder A 13 Hadamard-transforms the difference value 101 from the block matching means 12 in units of 4×4 pixels, and thereafter, encodes the transformed value by a Huffman coding method. The encoder A 13 supplies the encoded difference information to the code generator 15.

The encoder B 14 encodes the position information supplied from the block matching means 12, and supplies the encoded position information to the code generator 15. Note that the position information is obtained by assigning a predetermined code for each of the horizontal and vertical directions and sizes. As a simple example, a binary number with a sign may be used as a code.

On the other hand, coding may be realized by generating Huffman codes on the basis of the generation frequencies in units of directions and sizes.

The code generator 15 combines the encoded position information and the Huffman code (encoded difference information), and outputs the combined information as encoded data 103.

Figure 2:
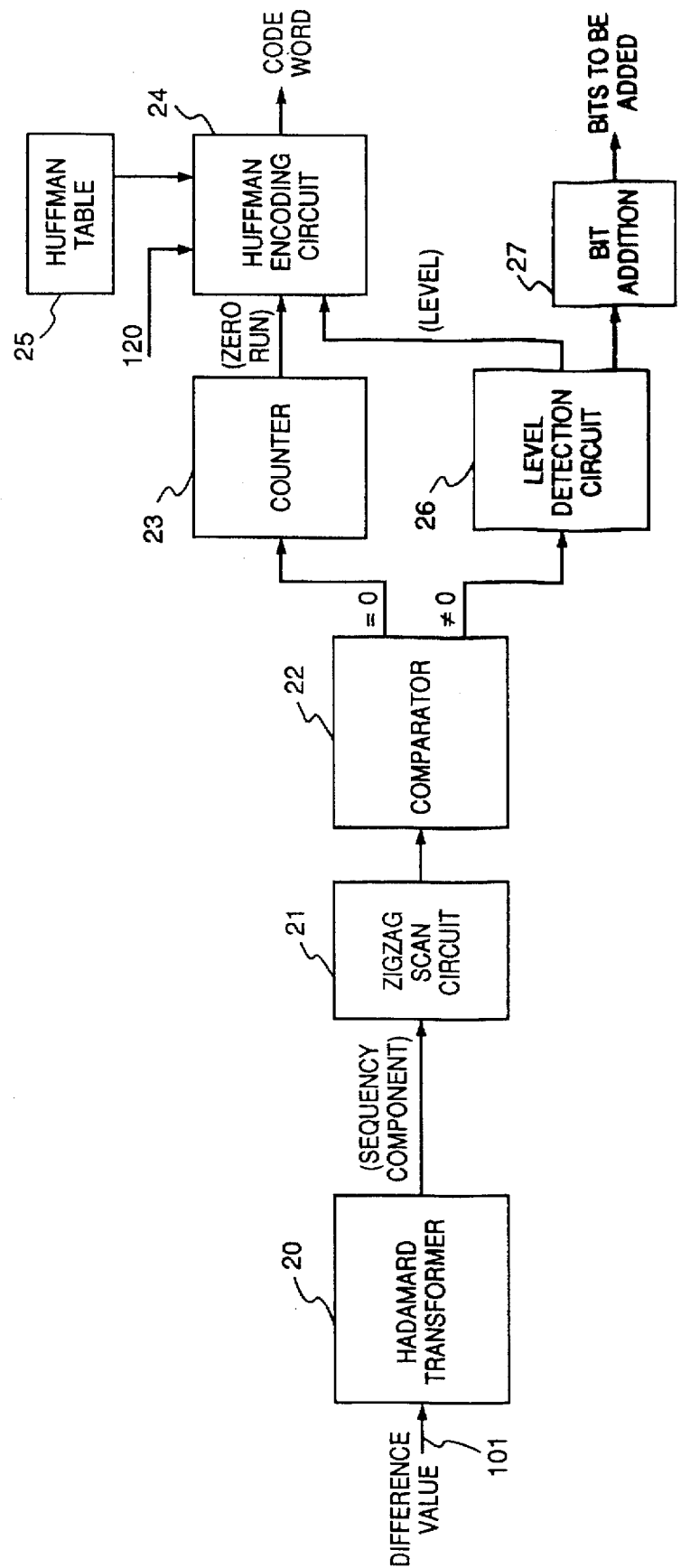
FIG. 2 is a block diagram showing in detail the arrangement of an encoder A shown in FIG. 1.

FIG. 2 is a block diagram showing in detail the arrangement of the encoder A 13 shown in FIG. 1.

Referring to FIG. 2, the difference value 101 supplied from the block matching means 12 is input to an Hadamard transformer 20, and is subjected to Hadamard transform as one of orthogonal transforms to be converted into sequency components.

The Hadamard transform is defined as follows:

$(y)ij \rightarrow (Y)ij$ $y=(y11, y12, \ldots, y44)$ $Y=(Y11, Y12, \ldots, Y44)$ $Y=(1/4)(H4)^2 y$ where $$H4 = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Note that $(H4)^2$ is a Kronecher product of H4 and H4.

However, in the above-mentioned definition, the Hadamard transformer 20 used in this embodiment uses $Y=(H4)^2 y$ in place of processing of (1/4) so as to prevent omission of bits in the quantization process.

FIG. 3 shows sequencies obtained by the Hadamard transform. In FIG. 3, the frequency becomes higher in the lower right direction. The power of sequencies is concentrated at the low-frequency side, and that at the high-frequency side assumes "0" or a very small value.

Each of the sequencies which are Hadamard-transformed and divided is input to a zigzag scan circuit 21. The zigzag scan circuit 21 converts 4×4 sequency components into an array of data in the order shown in FIG. 4, and supplies the converted data to a comparator 22.

The comparator 22 checks if a supplied sequence component is "0". If the sequency component is "0", the count value of a counter 23 is incremented by 1 to measure a zero-run length. If the sequency component is other than "0", a level detection circuit 26 discriminates the level. Levels are assigned in correspondence with the component values, as shown in FIG. 5.

A Huffman encoding circuit 24 selects two-dimensional Huffman codes from a Huffman table 25 on the basis of the zero-run length from the counter 23 and level information from the level detection circuit 26, and outputs the selected codes as a Huffman code word. At this time, the value of the counter 23 is reset to "0".

FIG. 5 shows, at the right end, the numbers of bits to be added corresponding-to component values. For example, when the component has level 2, the bits to be added are 2 bits of "00", "01", "10", and "11", which respectively represent four component values "-3", "-2", "2", and "3".

The level detection circuit 26 calculates bits to be added in accordance with the component values in a manner described above. A bit addition circuit 27 adds the calculated bits as bits to be added to the Huffman code word and outputs them together with the Huffman code word.

Note that FIG. 6 shows an example of the Huffman table 25. As shown in FIG. 6, the Huffman table is defined by a two-dimensional table of zero-run values and level values, and these codes are determined in advance on the basis of a typical image.

Figure 7:
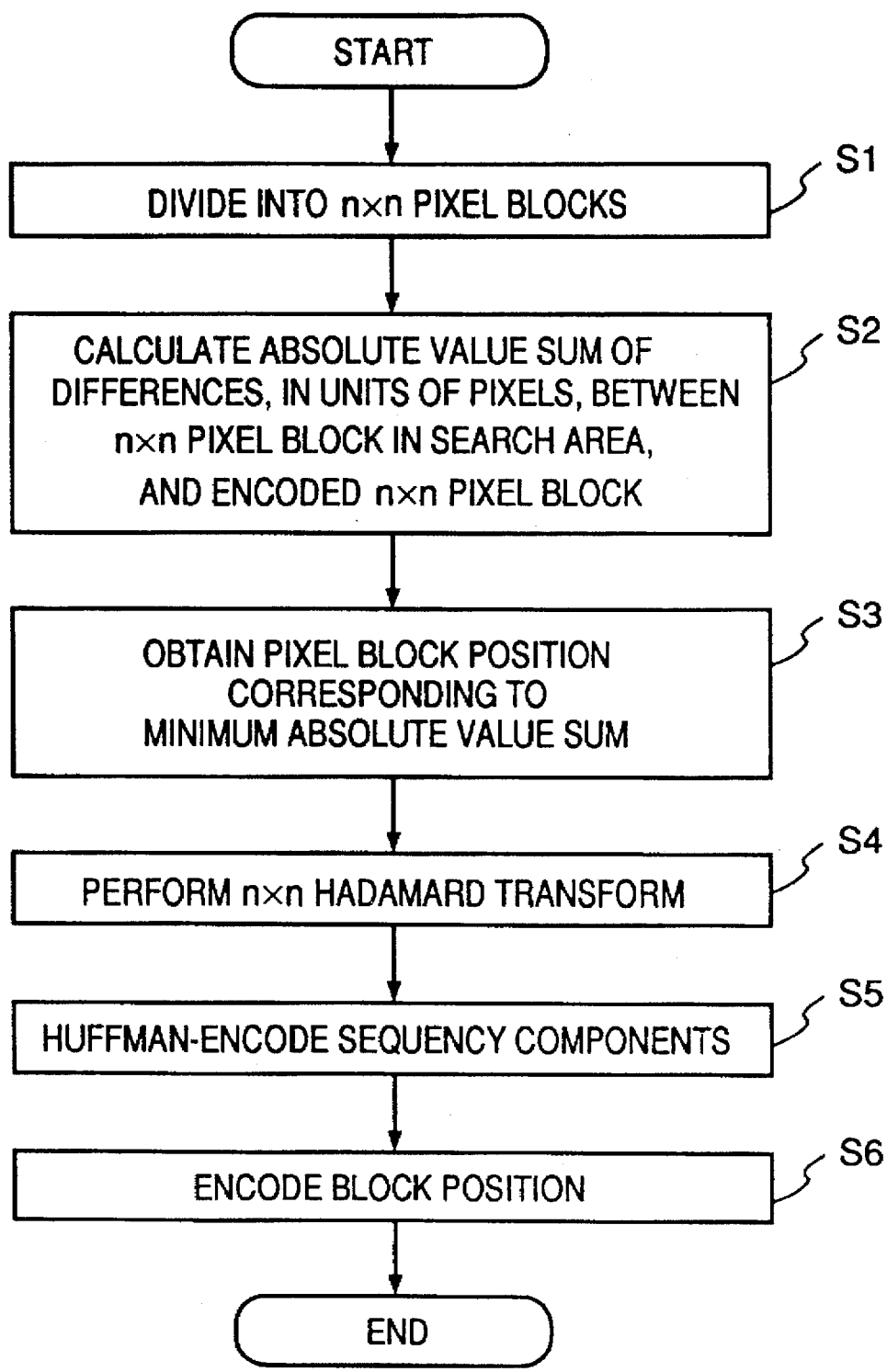
FIG. 7 is a flow chart showing coding processing of the first embodiment.

The coding processing of this embodiment with the above arrangement will be described in detail below with reference to the flow chart in FIG. 7.

In step S1, the block division circuit 9 divides the input image data 100 in units of n×n pixel blocks (e.g., n=4), and stores the blocks in the block buffer 10. In step S2, the block matching means 12 calculates an absolute value sum of differences, in units of pixels, between an encoded n×n pixel block stored in the block buffer 10, and an n×n pixel block in an encoded image area stored in the frame buffer 11 as a reference pixel block.

In step S3, the block matching means 12 moves the reference pixel block in the image area in units of pixels to obtain a pixel block position corresponding to a minimum absolute sum of differences. The means 12 outputs the block position information 102 corresponding to the minimum absolute value sum to the encoder B 14, and outputs the calculated difference value 101 to the encoder A 13.

The block search range of the block matching means 12 in step S3 will be explained below with reference to FIG. 8.

Figure 8:
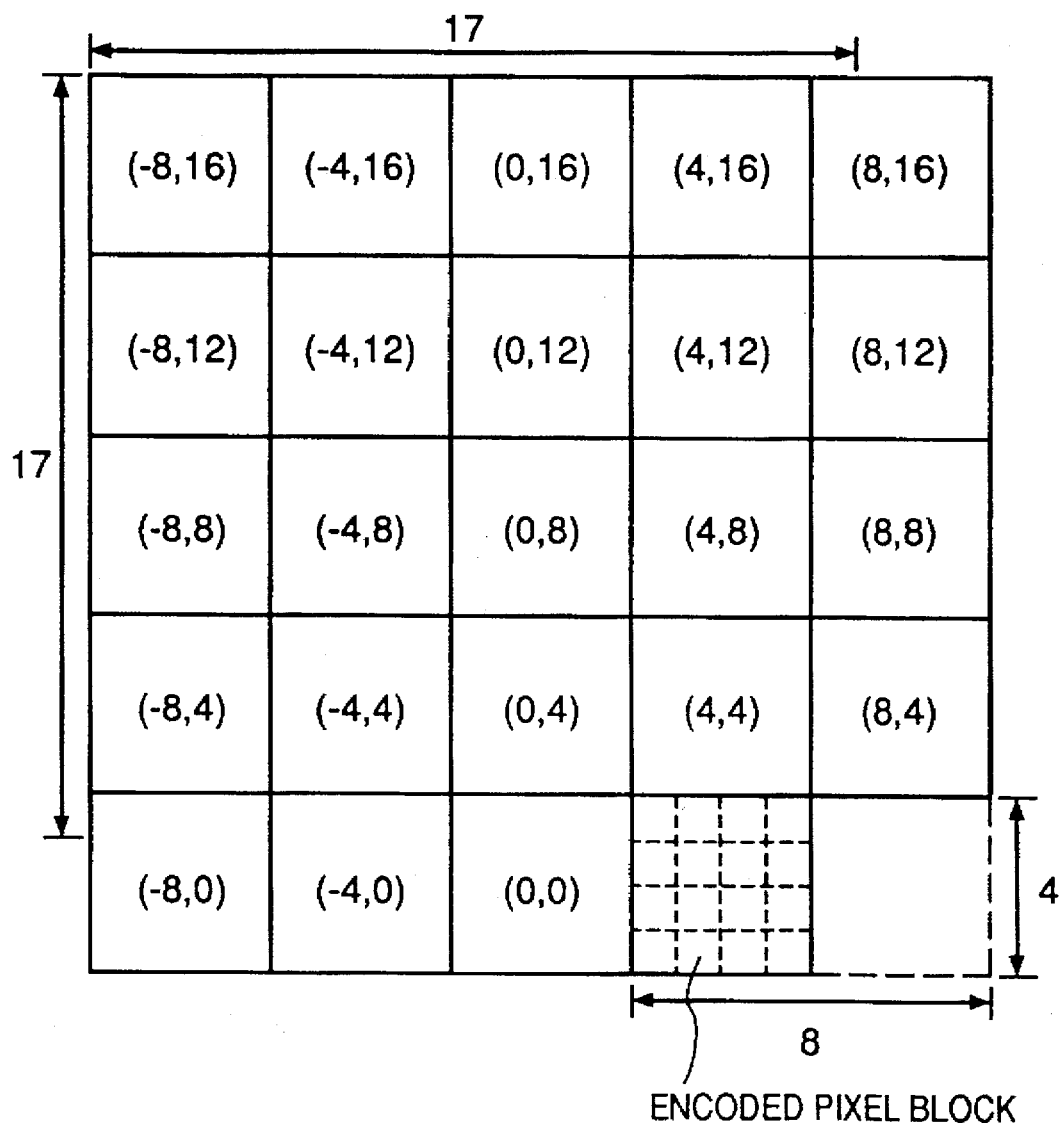
FIG. 8 is a view for explaining a search range of an encoded image according to the first embodiment of the present invention.

As shown in FIG. 8, in this embodiment, a range defined by +8th to −8th pixels in the main scan direction and 0th to 16th lines in the sub scan direction is used as a search range in units of 4×4 pixel blocks.

Note that two lower right 4×4 pixel blocks are not used. More specifically, pixels (1, 0) to (8, 0), (1, 1) to (8, 1), (1, 2) to (8, 2), and (1, 3) to (8, 3) are not used. Therefore, a position corresponding to the minimum absolute value sum is obtained from 257 calculation results (257={(17×17)−(8×4)}).

In step S4, the encoder A 13 Hadamard-transforms the difference value 101-from the block matching means 12 using the Hadamard transformer 20 in units of 4×4 pixels to divide it into power components of sequencies. In step S5, the zigzag scan circuit 21 zigzag-scans the sequency components, and thereafter, the scanned components are converted into variable length codes (VLC) by the two-dimensional Huffman table 25.

At the same time, in step S6, the encoder B 14 encodes the block position information from the block matching means 12, and supplies the encoded information to the code generator 15. The code generator 15 generates encoded data on the basis of the position information codes and the Huffman codes from the encoder A 13, and outputs the encoded data.

As described above, according to this embodiment, the two-dimensional correlation of an image can be fully utilized, and image data can be efficiently encoded.

In the above-mentioned embodiment, after the output from the code generator 15 is temporarily fed back to the frame buffer 11, the block matching means 12 searches for a block corresponding to a minimum difference value on the basis of the encoded data. Alternatively, block search may be performed based on the input image data 100 without using the encoded data. In this case, a decoder for decoding encoded data need not be arranged, and the circuit arrangement can be simplified.

(Second Embodiment)

The second embodiment of the present invention, which allows the same coding processing as described above even when a reference block and a block to be encoded have a relationship of rotation therebetween, will be described below. The basic arrangement of the second embodiment is the same as that of the first embodiment described above. However, in the second embodiment, when a reference block and a block to be encoded have a relationship of rotation (specific relationship) therebetween upon execution of block matching by the block matching means 12, blocks rotated in four directions are generated in advance for each reference block. The absolute sum of differences between each of the rotated blocks and a block to be encoded is checked to search for a minimum value and the corresponding rotational angle, and the detected difference value is encoded, thus achieving coding with higher efficiency.

In this case, block matching processes which are four times as many as the 257 positions of the first embodiment, are required.

Figure 9:
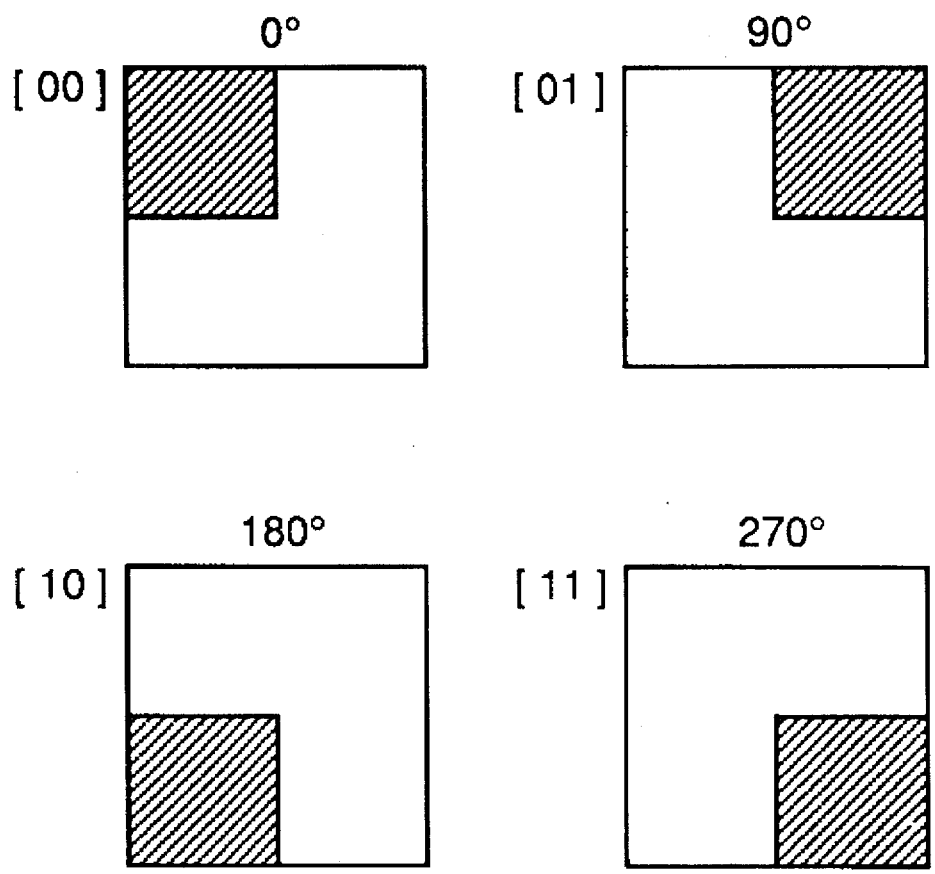
FIG. 9 is a view for explaining intra-block rotation patterns according to the second embodiment of the present invention.

FIG. 9 shows an example of blocks rotated in the four directions. In FIG. 9, encoded data, as an output from the encoder B 14 which presents position information, is added with a flag of two bits indicating the rotational direction ([00] corresponds to 0°; [01], 90°; [10], 180°; [11], 270°). The decoding side can decode an original image on the basis of the position information and the rotation information.

As described above, according to the second embodiment, even when a reference block and a block to be encoded have a relationship of rotation therebetween, the same coding processing as described above can be performed.

(Third Embodiment)

In the first embodiment described above, a search area is limited by a search range. However, the present invention is not limited to this. Thus, the third embodiment of the present invention, which allows an efficient search operation in a wider range, will be described below.

Figure 10:
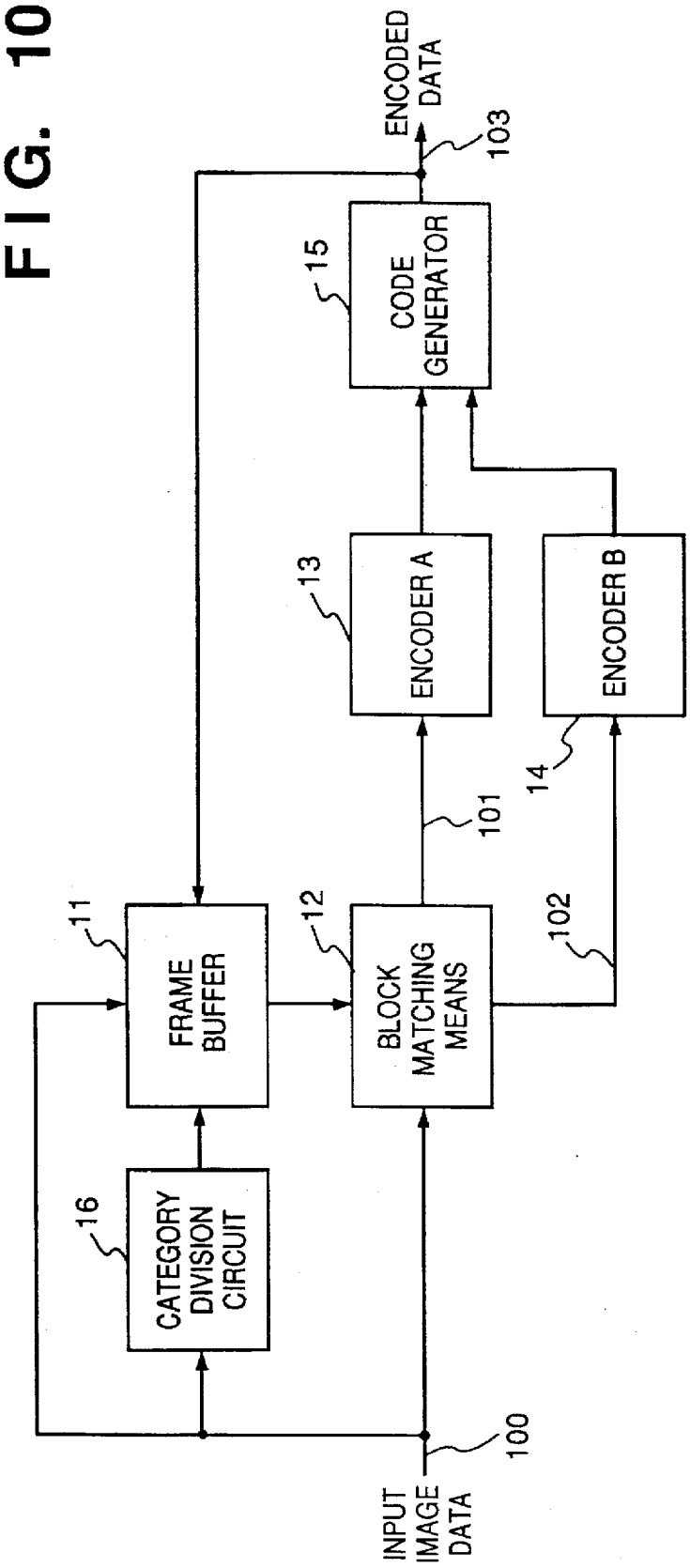
FIG. 10 is a block diagram showing the arrangement of an image encoder according to the third embodiment of the present invention.

FIG. 10 is a block diagram showing the arrangement according to the third embodiment of the present invention. In the third embodiment, in addition to the above-mentioned block division circuit 9 shown in FIG. 1, a category division circuit 16 classifies blocks of the input image data 100 into categories in accordance with the nature (e.g., including an edge or not) of an image in the block on the basis of a block average, a typical sequency components and the like, and stores the blocks in the frame buffer 11. The block matching means 12 controls to search for a minimum absolute value sum using reference blocks in the same category. With this arrangement, in the third embodiment, a wider range can be efficiently searched even when the calculation time (or the number of times of calculations) for the search operation remains the same.

(Another Embodiment)

In each of the above embodiments, an inter-block difference is Hadamard-transformed. However, other orthogonal transform methods such as DCT, K-L transform, and the like may be used. When the circuit scale is limited, the same effect can be expected when difference data is Huffman-encoded.

When the above-mentioned algorithm is independently applied to the respective colors of a color image (R, G, B), reversible coding of a color image can be realized.

In each of the second and third embodiments, as a specific relationship between a block to be encoded and a reference block, rotation or category information is used. Alternatively, other relationships such as a mirror image relationship may be used as a factor for search.

Figure 11:
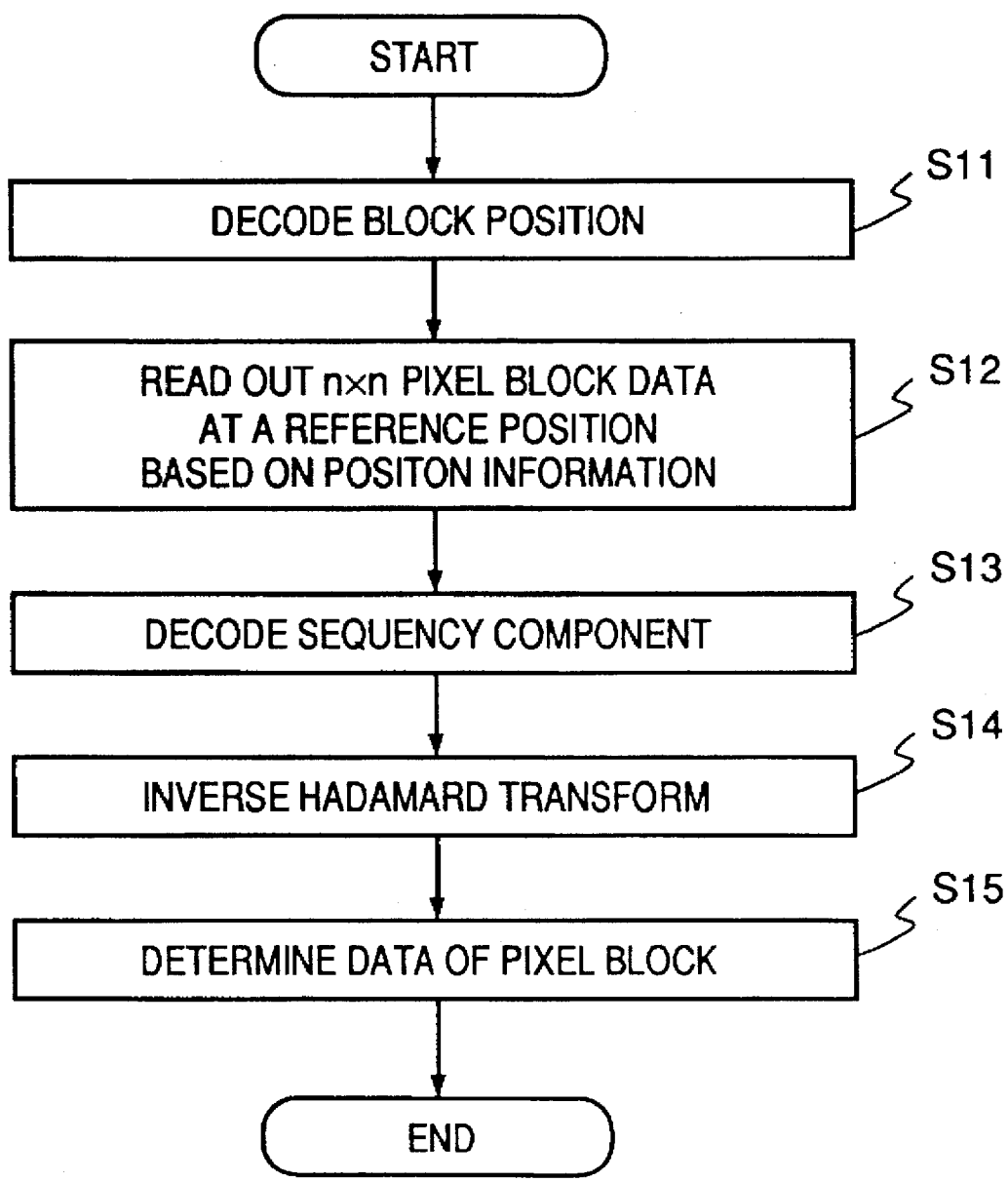
FIG. 11 is a flow chart showing a decoding sequence for decoding encoded data of the third embodiment.

Decoding processing for decoding encoded data encoded by the coding processing of each of the above embodiments will be described below with reference to FIG. 11. FIG. 11 is a flow chart showing decoding processing.

In decoding processing, position information is decoded by means for decoding a block position on the basis of position information code data in step S11. In step S12, n×n pixel block data at a reference position is read out using the position information from a block area which has already been decoded in a frame buffer which holds decoded data.

In step S13, Huffman codes are decoded by means for decoding sequency components from the Huffman codes. In step S14, the sequency components are inversely Hadamard-transformed by inverse Hadamard transform means to decode a difference image. In step S15, blocks of the difference image and the reference block are added in units of pixels to decode original pixel block data.

When the arrangement comprises this decoding function, decoding can be performed in addition to coding.

The present invention may be applied to either a system constituted by a plurality of devices such as an image scanner, a host computer, and a printer, or an apparatus consisting of a single device such as a copying system.

The present invention may be applied to a case wherein the invention is achieved by supplying a program stored in a storage medium such as a floppy disk to the system or apparatus, as a matter of course.

As described above, according to the present invention, the two-dimensional correlation of an image can be fully utilized, and image data can be efficiently encoded.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

storage means for storing one frame of an original image;

dividing means for dividing the one frame stored in said storage means into a plurality of blocks to be encoded;

generation means for extracting a reference block, from the original image, which is included in an area where encoding has been performed, and for generating a difference value between a part of the original image represented by the reference block and an image in each of the plurality of blocks; and encoding means for sequentially encoding the difference value generated by said generation means, wherein the encoding by said encoding means is lossless encoding of the difference value generated by said generation means so as to be able to reproduce the original image, using the encoded difference value.

2. The apparatus according to claim 1, wherein said encoding means encodes information indicating a location of the reference block, together with the difference value.

3. The apparatus according to claim 1, wherein said encoding means encodes the difference value after performing an orthogonal transformation on the difference value.

4. The apparatus according to claim 1, wherein said generation means extracts the reference block such that the difference value represents a minimum value and encodes the difference value of the minimum value.

5. An image processing method, comprising the steps of:

storing one frame of an original image;

dividing the one frame stored in said storing step into a plurality of blocks;

extracting a reference block, from the one frame stored in said storing step, which is included in an area where encoding has been performed; and generating a difference value between a part of the original image represented by the reference block and an image in each of the plurality of blocks; and sequentially encoding the difference value generated in said generating step;

wherein the encoding in said encoding step is lossless encoding of the difference value generated in said generating step so as to be able to reproduce the original image, using the encoded difference value.

* * * * *

UNITED STATES PATENT AND TRADEMARK OFFICE
CERTIFICATE OF CORRECTION

PATENT NO. : 5,732,157

DATED : March 24, 1998

INVENTOR(S): HIDEFUMI OSAWA

It is certified that error appears in the above-identified patent and that said Letters Patent is hereby corrected as shown below:

<u>IN THE DRAWINGS</u>

Sheet 10 of 11,
   Fig. 11, "POSITON" should read --POSITION--.

<u>COLUMN 4</u>

Line 2, "corresponding-to" should read --corresponding to--.
Line 46, "101-from" should read --101 from--.

Signed and Sealed this

Thirteenth Day of October 1998

Attest:

BRUCE LEHMAN

*Attesting Officer*     *Commissioner of Patents and Trademarks*